US008808641B2

(12) United States Patent
Magni et al.

(10) Patent No.: US 8,808,641 B2
(45) Date of Patent: Aug. 19, 2014

(54) ASSEMBLY OF A MICROFLUIDIC DEVICE FOR ANALYSIS OF BIOLOGICAL MATERIAL

(75) Inventors: Pierangelo Magni, Villasanta (IT); Roberto Brioschi, Sesto S. Giovanni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1056 days.

(21) Appl. No.: 12/343,275

(22) Filed: Dec. 23, 2008

(65) Prior Publication Data

US 2009/0215194 A1 Aug. 27, 2009

Related U.S. Application Data

(63) Continuation-in-part of application No. PCT/IT2006/000485, filed on Jun. 23, 2006.

(51) Int. Cl.
*B01L 3/00* (2006.01)
*G01N 1/10* (2006.01)

(52) U.S. Cl.
USPC ........... 422/503; 422/500; 422/501; 422/502; 422/504; 436/180

(58) Field of Classification Search
USPC .................................. 422/500–504; 436/180
See application file for complete search history.

(56) References Cited

U.S. PATENT DOCUMENTS

| | | | | |
|---|---|---|---|---|
| 5,346,672 | A | 9/1994 | Stapleton et al. | |
| 5,640,995 | A * | 6/1997 | Packard et al. | 137/597 |
| 6,376,291 | B1 | 4/2002 | Barlocchi et al. | |
| 6,670,257 | B1 | 12/2003 | Barlocchi et al. | |
| 6,673,593 | B2 | 1/2004 | Mastromatteo et al. | |
| 6,710,311 | B2 | 3/2004 | Villa et al. | |
| 6,727,479 | B2 | 4/2004 | Villa et al. | |
| 6,770,471 | B2 | 8/2004 | Barlocchi et al. | |
| 2003/0152927 | A1 * | 8/2003 | Jakobsen et al. | 435/6 |
| 2004/0072278 | A1 | 4/2004 | Chou et al. | |
| 2004/0132059 | A1 | 7/2004 | Scurati et al. | |
| 2004/0141856 | A1 | 7/2004 | Scurati | |

FOREIGN PATENT DOCUMENTS

| | | | |
|---|---|---|---|
| EP | 1415710 | A1 | 5/2004 |
| WO | 03049860 | A1 | 6/2003 |
| WO | 03060157 | A2 | 7/2003 |

* cited by examiner

*Primary Examiner* — Dean Kwak
(74) *Attorney, Agent, or Firm* — Seed IP Law Group PLLC

(57) ABSTRACT

In a microfluidic assembly, a microfluidic device is provided with a body in which at least a first inlet for loading a fluid for analysis, and a buried area in fluid communication with the first inlet are defined. An analysis chamber is in fluid communication with the buried area and an interface cover is coupled in a fluid-tight manner above the microfluidic device. The interface cover is provided with a sealing portion in correspondence to the analysis chamber, operable to assume a first configuration, in which it leaves the analysis chamber open, and a second configuration, in which it closes the analysis chamber in a fluid-tight manner.

32 Claims, 7 Drawing Sheets

ASSEMBLY OF A MICROFLUIDIC DEVICE FOR ANALYSIS OF BIOLOGICAL MATERIAL

BACKGROUND

1. Technical Field

The present invention relates to the assembly of a microfluidic device for the analysis of biological material, in particular for nucleic acid analysis using PCR-type processes, to which the following treatment will make explicit reference, without this implying any loss in generality.

2. Description of the Related Art

Typical procedures for analyzing biological materials, such as nucleic acid, protein, lipid, carbohydrate, and other biological molecules, involve a variety of operations starting from raw material. These operations may include various degrees of cell separation or purification, cell lysis, amplification or purification, and analysis of the resulting amplification or purification product.

As an example, in DNA-based blood analyses, samples are often purified by filtration, centrifugation or by electrophoresis so as to eliminate all the non-nucleated cells, which are generally not useful for DNA analysis. Then, the remaining white blood cells are broken up or lysed using chemical, thermal or biochemical means in order to free the DNA to be analyzed. Next, the DNA is denatured by thermal, biochemical or chemical processes and amplified by an amplification reaction, such as PCR (polymerase chain reaction), LCR (ligase chain reaction), SDA (strand displacement amplification), TMA (transcription-mediated amplification), RCA (rolling circle amplification), and the like. The amplification step allows the operator to avoid purification of the DNA being studied because the amplified product greatly exceeds the starting DNA in the sample.

If RNA is to be analyzed, the procedures are similar, but more emphasis is placed on purification or other means to protect the labile RNA molecule. RNA is usually copied into DNA (cDNA) and then the analysis proceeds as described for DNA.

The amplification product undergoes some type of analysis, usually based on sequence or size or some combination thereof. In an analysis by hybridization, for example, the amplified DNA is passed over a plurality of detectors made up of individual oligonucleotide detector fragments that are anchored, for example, on electrodes. If the amplified DNA strands are complementary to the oligonucleotide detectors or probes, stable bonds will be formed between them (hybridization). The hybridized detectors can be read by observation using a wide variety of means, including optical, electromagnetic, electromechanical or thermal means (the so-called "detection" step).

Other biological molecules are analyzed in a similar way, but typically molecule purification is substituted for amplification, and detection methods vary according to the molecule being detected. For example, a common diagnostic involves the detection of a specific protein by binding to its antibody. Such analysis requires various degrees of cell separation, lysis, purification and product analysis by antibody binding, which itself can be detected in a number of ways. Lipids, carbohydrates, drugs and small molecules from biological fluids are processed in similar ways. However, the following discussion will be focused on nucleic acid analysis, in particular DNA analysis, as an example of a biological molecule that can be analyzed using the devices of the invention.

Integrated microfluidic devices for the analysis of nucleic acids are known, which are based on a die of semiconductor material (the so-called LOC, Lab-On-Chip), integrating a series of elements and structures allowing the variety of functions required for the amplification and identification of oligonucleotide sequences to be carried out.

In detail, as is shown in FIG. 1, a microfluidic device 1 for the analysis of DNA, of the integrated type, comprises a base support 2 (in particular, a PCB—Printed Circuit Board) and a microfluidic die 3. The microfluidic die 3 is carried by the base support 2, which also carries the required electrical connections with the outside.

In greater detail, as shown in FIGS. 2 and 3, the microfluidic die 3 comprises a substrate 4 of semiconductor material and a structural layer 5 arranged on the substrate 4 (for example, a layer of glass coupled to the substrate 4). Inlet reservoirs 6 (numbering four, for example) are defined through the structural layer 5, and are in fluid communication with substrate inlets 7 formed through a surface portion of the substrate 4.

A plurality of microfluidic channels 8 (for example, three for each inlet reservoir 6), buried inside the substrate 4 and each one in communication with a respective substrate inlet 7, connect the substrate inlets 7 with respective substrate outlets 9, also formed through a surface portion of the substrate 4.

A detection chamber 10 is defined in the structural layer 5 at the substrate outlets 9, to which it is fluidically connected. In particular, the detection chamber 10 is adapted to receive a fluid containing pre-processed (for example, via suitable heating cycles) nucleic material in suspension from the microfluidic channels 8, to carry out an optical identification step for nucleic acid sequences. To this end, the detection chamber 10 houses a plurality of so-called "DNA probes" 11, comprising individual filaments of reference DNA containing set nucleotide sequences; more precisely, the DNA probes 11 are arranged in fixed positions to form a matrix (a so-called micro-array) 12 and are, for example, grafted onto the bottom of the detection chamber 10. At the end of a hybridization step, some of the DNA probes, indicated by 11', which have bound with individual sequences of complementary DNA, contain fluorophores and are therefore detectable with optical techniques (so-called "bio-detection").

Heating elements 13, for example polysilicon resistors, are formed on the surface of the substrate 4 and extend transversally with respect to the microfluidic channels 8. The heating elements 13 can be electrically connected, in a known manner, to external electrical power sources (here not shown) in order to release thermal power to the microfluidic channels 8, for controlling their internal temperature according to given heating profiles (during the above-mentioned heating cycles). In particular, in FIG. 1, contact pads 14 arranged on the base support 2 at the side of the microfluidic die 3 electrically contact the heating elements 13, which in turn electrically contact electrodes 15 formed on the surface of the base support 2; side covers 16 ("globe-tops"), for example made in resin, cover the contact pads 14 at the sides of the microfluidic die 3.

In use, to avoid contamination of the biological material or its evaporation due to the high temperatures that develop during the heating cycles to which the material is subjected, it is required to seal some or all of the substrate inlets 7, the substrate outlets 9 and the detection chamber 10. For example, during the heating cycles all of the above-mentioned openings must be sealed. Conversely, during operations such as the loading of the biological sample to analyze, at least the substrate inlets 7 must be accessible from the outside. Similarly, the substrate outlets 9 and the detection chamber 10 must be accessible during washing and rinsing operations of the detection chamber 10.

In patent application EP 05112913.8 filed in the name of the same applicant on 23 Dec. 2005, the use of gaskets made of a soft biocompatible material, coupled to elastic clips configured to close with pressure on the lateral edges of the base support 2, is described as releasable seals on regions of the microfluidic device. The elastic clips, for example made of a plastic material, are manually applied by a user in correspondence to regions of interest (in particular, the use of at least two plastic clips is suggested for sealing, one for the substrate inlets 7, and the other for the substrate outlets 9 and the detection chamber 10), and their positioning is facilitated by the presence of specially provided positioning pins on the base support 2. When applied in position, the clips push the gaskets against the openings, to seal them.

BRIEF SUMMARY

According to an embodiment of the present invention, a microfluidic assembly is provided, including a substrate of semiconductor material, an interface cover, and a cap. The substrate of semiconductor material includes a buried channel extending therein, the channel having an inlet at a first end and an outlet at a second. An analysis chamber is positioned such that the outlet of the buried channel opens into the analysis chamber, and the interface cover is positioned over the substrate with a lower surface facing an upper surface of the substrate. A mobile structure is positioned over the analysis chamber and is movable between a closed position, in which the analysis chamber is sealed by the mobile structure, and an open position, in which the analysis chamber is open.

According to another embodiment, an inlet hole extends in the interface cover, transverse to the lower surface, that opens to an upper surface of the interface cover. An inlet channel extends in the interface cover parallel to the lower surface, and places the inlet hole and the inlet of the buried channel in fluid communication.

According to an embodiment, the cap is positioned over the interface cover and is movable between an open position, in which the inlet hole is accessible, and a closed position, in which the inlet hole is closed by the cap, According to another embodiment, the interface cover comprises a plurality of passages opening to the upper surface of the interface cover and in fluid communication with the analysis chamber. The cap is positioned over the interface cover and is movable between an open position, in which each of the plurality of passages is accessible, and a closed position, in which each of the plurality of passages is closed by the cap.

According to various embodiments, methods of manufacture and operation are also provided.

BRIEF DESCRIPTION OF THE SEVERAL VIEWS OF THE DRAWINGS

For a better understanding of the present invention, preferred embodiments thereof are described below, purely by way of example and with reference to the enclosed drawings.

DETAILED DESCRIPTION

Figure 1:
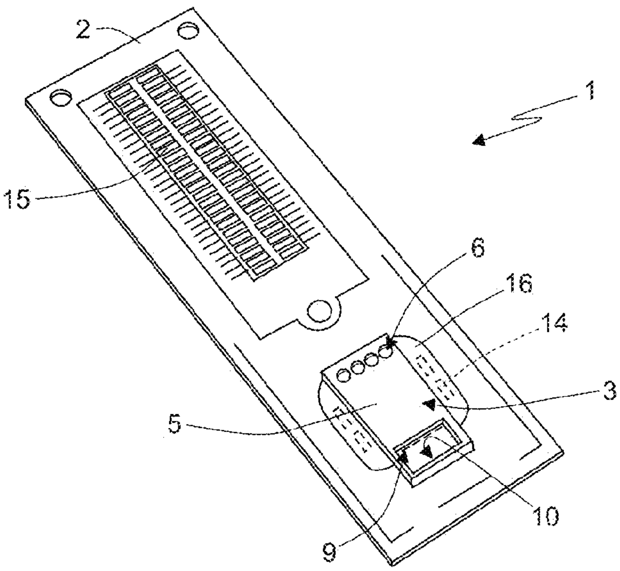
Fig. 1 Prior Art
FIG. 1 shows a perspective top view of a microfluidic device of a known type.

The previously described integrated microfluidic devices, although allowing rapid and economic analysis of biological material samples, are not completely optimized, exhibiting certain problems in the structure and in the manufacturing process.

First of all, the use of the structural layer 5 made of glass is particularly expensive and also requires additional process steps for its coupling (for example, via bonding techniques) to the substrate 4.

The structural layer 5 is usually open to the outside at the substrate inlets and outlets and the detection chamber (except where the above-mentioned clips are used). Accordingly, the risk of contamination exists for the biological material contained inside the microfluidic device. The elastic clips must be applied manually by the user during predefined steps of the biological material analysis cycle; any positioning error can therefore cause contamination and compromise the results of the analysis. Due to the high temperatures developing during the heating cycles, the clips and the associated gaskets may not guarantee perfect sealing and, in the worst case, could cause the material to leak out.

In addition, the loading of biological material must be carried out manually by an operator, using a standard type of pipette, directly onto the microfluidic die 3 at the inlet reservoirs 6 and the associated substrate inlets 7. This operation is difficult due to the small dimensions and, in particular, the small distance separating the inlets.

Figure 4:
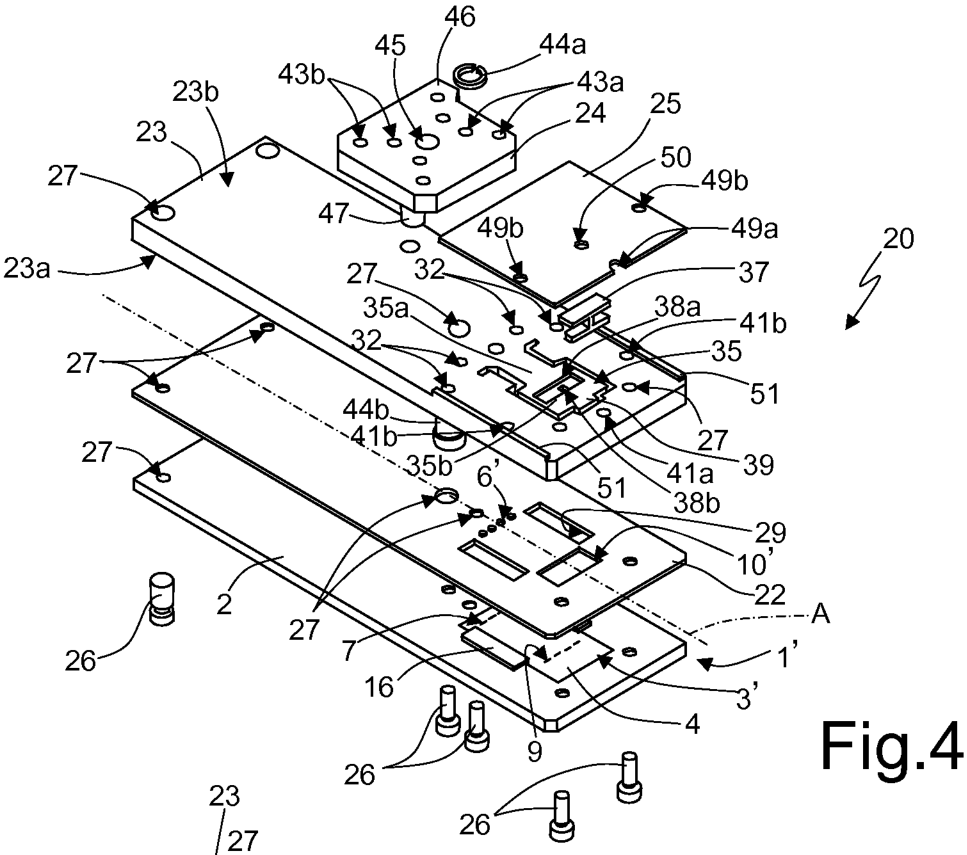
FIG. 4 is an exploded, perspective top view of a microfluidic assembly according to an embodiment of the present invention.
Figure 5:
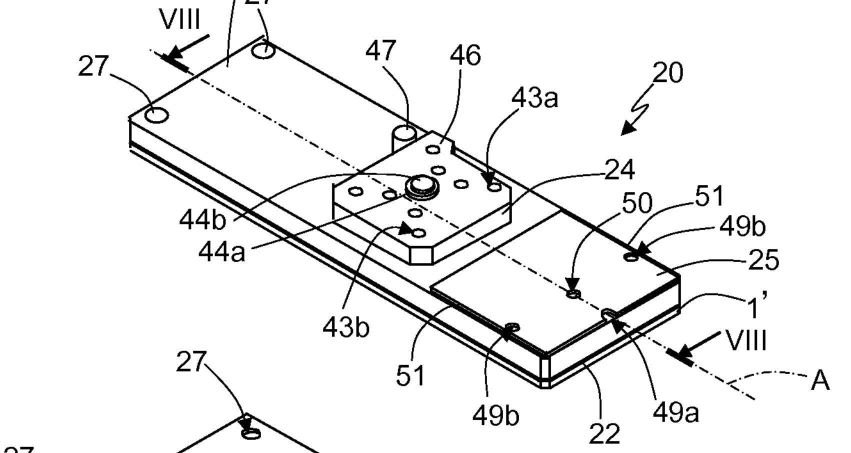
FIG. 5 is a perspective top view of the assembly in FIG. 4, in the assembled condition.

As shown in FIGS. 4 and 5, a microfluidic assembly 20 according to a first embodiment of the present invention comprises a microfluidic device 1', a structural cover 22 on the microfluidic device 1', an interface cover 23 on the structural cover, and a first and second cap 24 and 25 coupled to, and arranged on, the interface cover. Connection elements 26, screws or rivets for example, inserted in purposely provided coupling holes 27 formed at corresponding points in the various layers, connect and couple the microfluidic device 1', structural cover 22 and interface cover 23 together. The microfluidic device 1', structural cover 22 and interface cover 23 have a generally parallelepipedal shape with a main extension direction and have a middle axis A.

Figure 2:
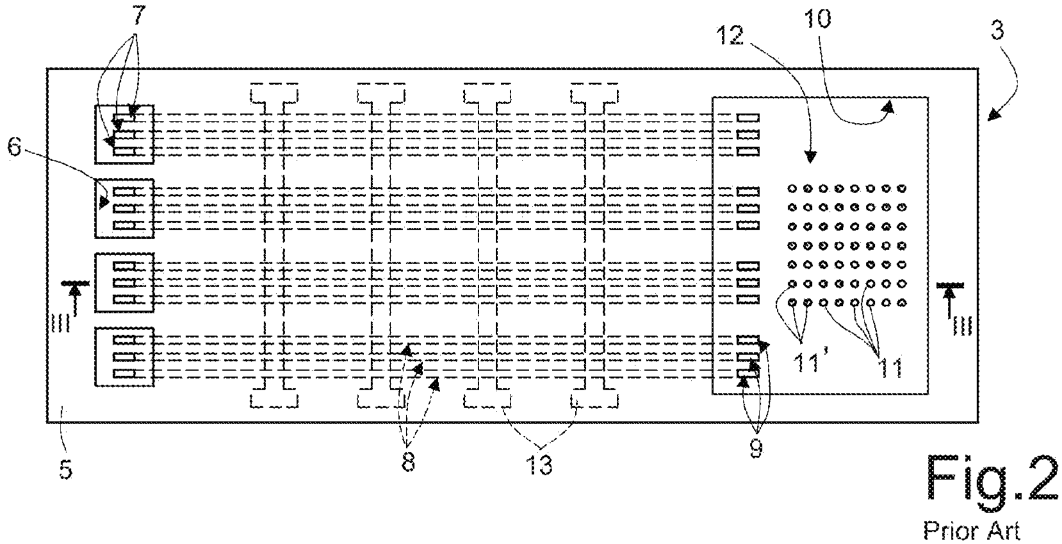
Fig. 2 Prior Art
FIG. 2 is a plan view of a microfluidic die of the device of FIG. 1.
Figure 3:
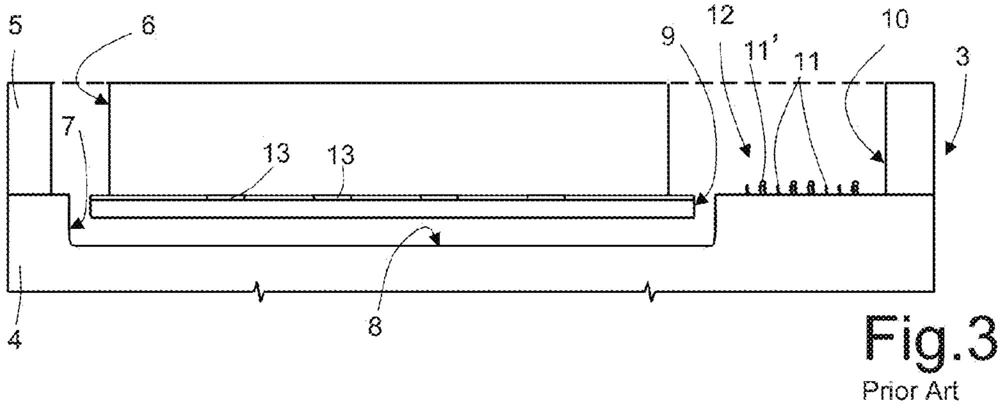
Fig. 3 Prior Art
FIG. 3 is a cross-section through the die in FIG. 2, along the line III-III.

In detail, in a manner substantially similar to the device described with reference to FIGS. 1-3, so that parts similar to others already described are denoted with the same reference numbers, the microfluidic device 1' comprises a base support 2 (in particular, a PCB—Printed Circuit Board, or a glass, ceramic or metal sheet or a flexible tape) and a microfluidic die 3'. The microfluidic die 3' is carried on the base support 2 at one of its ends, and the base support 2 carries the necessary input/output electrical connections. In particular, the microfluidic die 3' differs from that illustrated in FIGS. 1-3 due to the fact that it does not include a structural layer, of glass in particular, positioned above the substrate 4 and in which the microfluidic channels 8 are buried. The microfluidic die 3' still comprises the substrates inlets and outlets 7 and 9 coupled to the microfluidic channels 8.

Figure 6:
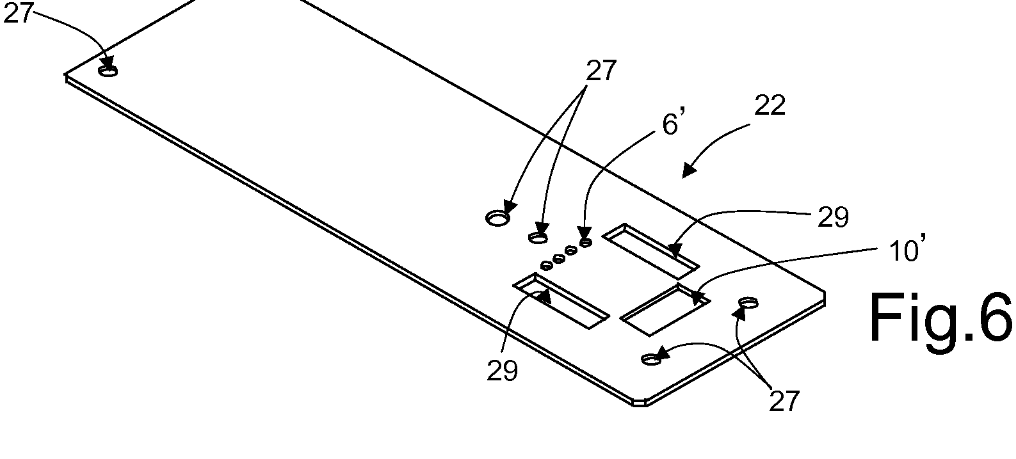
FIG. 6 is a perspective top view of a structural layer of the assembly in FIG. 4.

According to an embodiment of the present invention, the structural cover 22 is substantially symmetrical with respect to the middle axis A (see also FIG. 6) and defines on the microfluidic die 3' all the openings/chambers traditionally defined by the structural glass layer and, in particular: inlet reservoirs 6' (substantially equivalent to the inlet reservoirs 6 in FIG. 3) in fluid communication with the substrate inlets 7, and a detection chamber 10' (substantially equivalent to the detection chamber 10 in FIG. 3), in fluid communication with the substrate outlets 9. The structural cover 22 is made of an elastomeric material (for example, a silicone gel, such as Sylgard®) and has a thickness, for instance, of 500 μm. Housing openings 29 are also made in the structural cover 22, lateral to the microfluidic die 3', for receiving the side covers 16 of the electrodes of the heating elements associated with the microfluidic channels 8 (refer to FIGS. 1-2, as well).

The interface cover 23 is made of glass, ceramic, metal or preferable transparent plastic (Lexan® for example) and has a series of features that facilitate external interfacing with the microfluidic device 1' and also, in certain operating conditions, allow sealing to be achieved on certain areas of the device.

Figure 7:
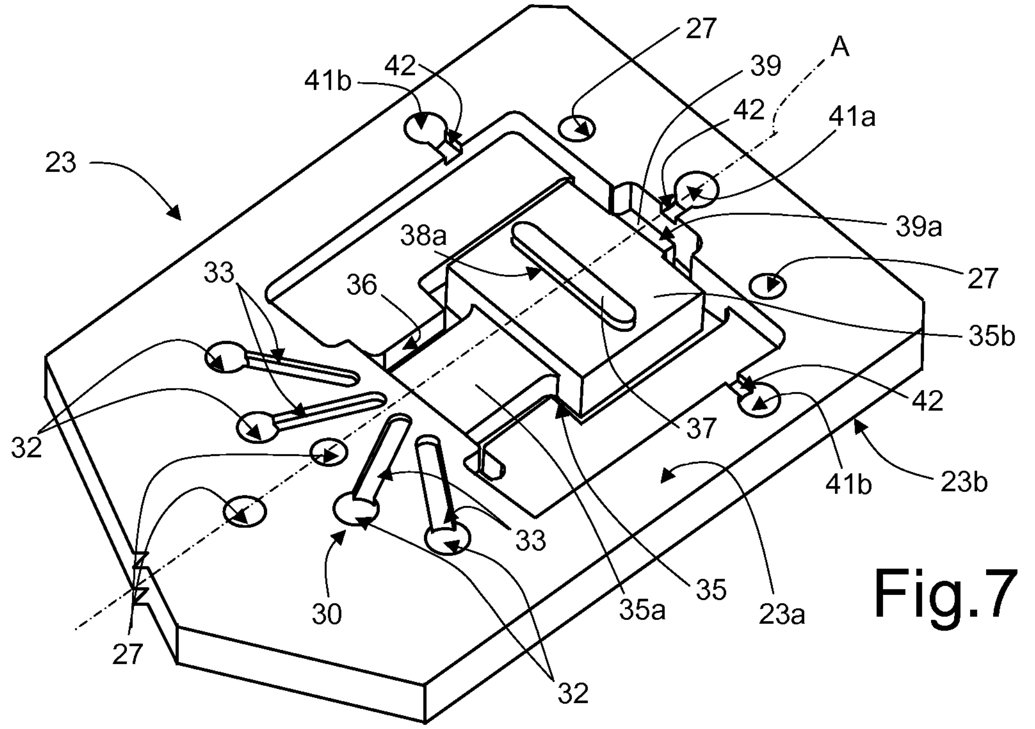
FIG. 7 is a perspective bottom view of a portion of an interface layer of the assembly in FIG. 4, according to an embodiment.

In detail, as can also be seen in FIG. 7, which shows its lower surface 23*a* that contacts the underlying structural cover 22, the interface cover 23, also substantially symmetrical with respect to the middle axis A, includes a channel arrangement 30, above and in fluid communication with the inlet reservoirs 6'; the channel arrangement 30 connects the inlet reservoirs 6' with inlet holes 32 formed through the interface cover 23. As will be described further on, access from the outside to the microfluidic device 1' is achieved through the inlet holes 32. In particular, the channel arrangement 30 is configured to redistribute the inlets to the microfluidic device 1', to obtain a desired arrangement of the inlet holes 32, different from the original layout of the substrate inlets 7.

In greater detail, the channel arrangement 30 comprises a plurality of inlet channels 33, for example in numbers matching the number of the inlet reservoirs 6', formed as recesses into the inside of the interface cover 23, in such a manner that they are defined by the same interface cover 23 with regards to respective upper and side walls, and by the underlying structural cover 22 with regards to a respective lower wall. The inlet channels 33 start at the inlet reservoirs 6' and terminate at the inlet holes 32, and are configured so that the inlet holes 32 are spaced a greater distance apart (for example, even an order of magnitude greater) than a corresponding distance of separation between the inlet reservoirs 6'. In addition, the inlet channels 33 all usefully have the same length (between a respective inlet hole 32 and a corresponding inlet reservoir 6'), so as to guarantee filling the channels with an identical amount of fluid (as described further on).

The interface cover 23 also includes, in correspondence to the detection chamber 10', a mobile structure 35 provided with freedom of movement in a vertical direction, orthogonal to the lower surface 23*a* of the interface cover.

Figure 8A:
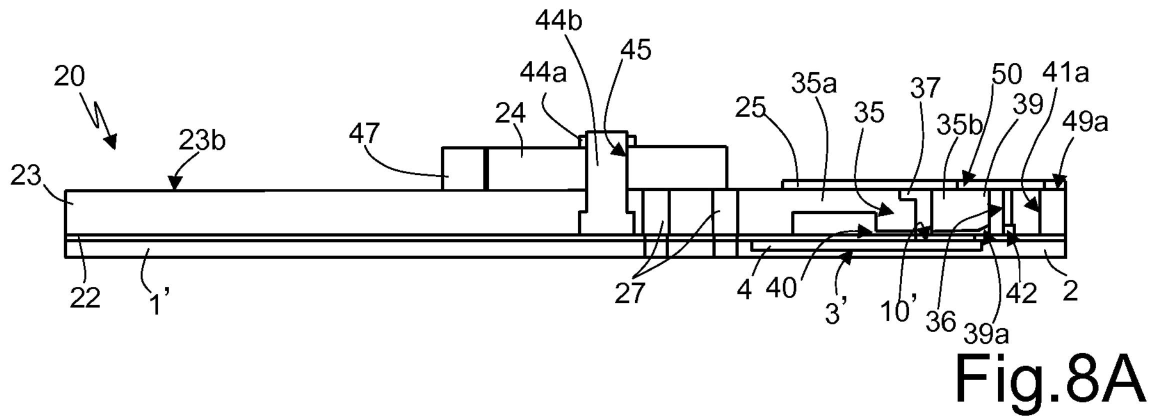
FIG. 8A is a cross-section through the assembly of FIG. 5, taken along the line VIII-VIII.
Figure 8C:
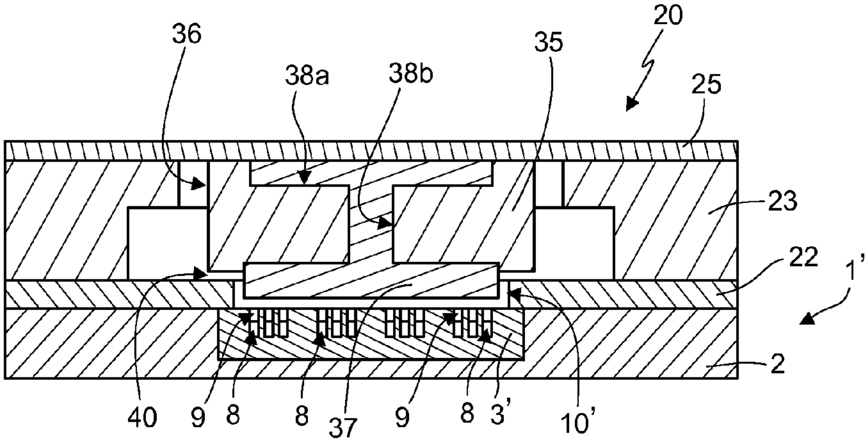
FIG. 8C shows a cross-section of the assembly of FIG. 8B, taken along the line VIIIC-VIIIC.
Figure 8B:
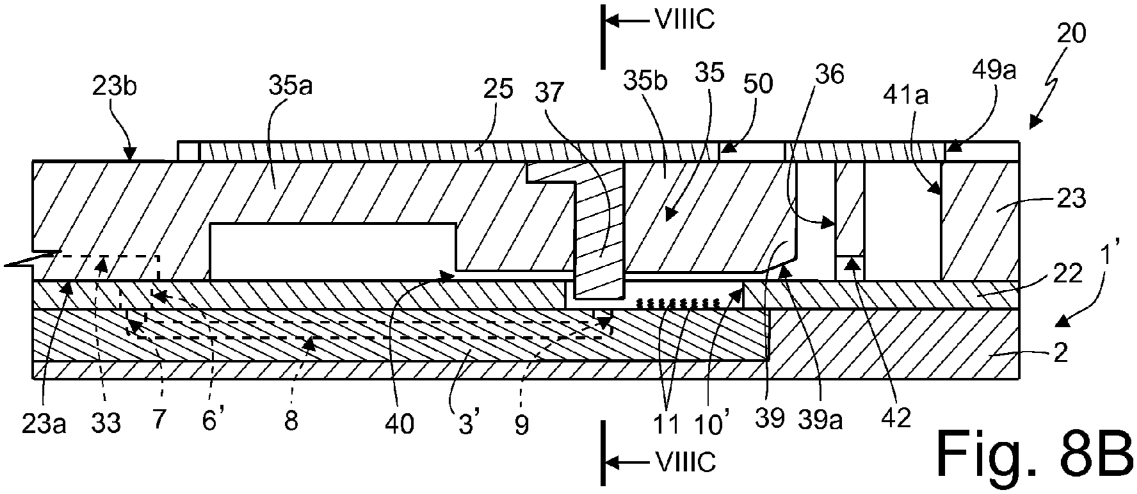
FIG. 8B shows an enlarged portion of the cross-section in FIG. 8A.

In detail, also with reference to FIGS. 8A-8C, the mobile structure 35 is housed in a cavity 36 that traverses the interface cover 23 for its entire thickness, and includes a connection element 35*a* connected to the interface cover 23 and a body element 35*b* integral with the connection element 35*a;* the mobile structure 35 is thus surrounded on three sides by the cavity 36. In particular, the thickness of the connection element 35*a* is less than that of the body element 35*b,* which is in turn, less than that of the interface cover 23. The body element 35*b* also has a central sealing element 37, made of an elastomeric material, silicone for instance, embedded into the body element and slightly protruding from it at the lower surface 23*a*. In particular, the sealing element 37 is made by hardening of silicone material (starting from a liquid gel for example), using the body element 35*b* as a mould. In fact, as shown in the exploded diagram in FIG. 4, when uncoupled from the sealing element 37, the body element 35*b* has upper and lower recesses 38*a* communicating via a through hole 38*b;* the sealing element 37 is formed by filling the recesses 38*a* and the through hole 38*b* with the silicone material.

The mobile structure 35 also has a tongue 39 integral with, and extending to form a projecting part from, an end surface of the body element 35*b*, opposite to the connection element 35*a*. The tongue 39 has an inclined surface 39*a* connecting with the body element 35*b*, and forming an acute angle with the lower surface 23*a* of the interface cover.

In use, the body element 35*b* of the mobile structure 35 is arranged at rest above the detection chamber 10' without touching the structural cover 22; furthermore, the sealing element 37 is positioned partially inside the detection chamber 10' above the substrate outlets 9, without however touching the substrate 4 of the microfluidic die 3'. In this operating condition, a gap 40 is thus present between the body element 35*b* and the sealing element 37, and the detection chamber 10' and the substrate outlets 9, which are therefore open at the top. As described in detail further on, the application of a force/pressure on the mobile structure 35 makes the body element 35*b* and the associated sealing element 37 move towards the structural cover 22, sealing the detection chamber 10', with the body element 35*b* abutting against the structural cover 22, and the sealing element 37 abutting directly against the substrate outlets 9 of the substrate 4.

The interface cover 23 also includes a plurality of washing openings—made of respective through holes that traverse the interface cover, and of respective channel portions formed in the lower surface 23*a* of the interface cover—for loading/extracting a washing fluid into/from the detection chamber 10'. In detail, there is a washing inlet 41*a*, arranged along the middle axis A in a position facing the tongue 39, and two washing outlets 41*b* arranged lateral to the body element 35*b*, on opposite sides with respect to the middle axis A. In particular, the washing inlet 41*a* and the washing outlets 41*b* are connected to the cavity 36 through respective washing channels 42 formed in the interface cover 23.

Moreover, the interface cover has a substantially flat upper surface 23*b*.

The first cap 24 is arranged above the interface cover 23 in correspondence to the inlet holes 32, and is made, for example, of a plastic material. In detail, two series of filling holes 43*a* and 43*b*, located on opposite sides of the cap 24, are formed through the first cap 24; the layout of the filling holes of each series reproduces the layout of the inlet holes 32. Furthermore, the filling holes 43*a* and 43*b*, like the inlet holes 32, are shaped so as to facilitate the insertion of a suitable fluid-loading element, for example, a pipette or syringe. As will be clarified further on, a first series of filling holes 43*a* is to be used for loading biological material inside the microfluidic device 1', while the second series of filling holes 43*b* is to be used for loading a buffer solution (water and salt for example); the two series of filling holes 43*a* and 43*b* are separate and distinct in order to avoid contamination due to fluid residues.

The first cap 24 is coupled to the interface cover 23 so that it is free to rotate around an axis orthogonal to the upper surface 23*b* of the interface cover. In detail, the first cap 24 is coupled via a bushing 44*a* and a pivot pin 44*b* that rests on the structural cover 22, traverses the interface cover 23, and engages in a coupling hole 45 formed at the center of the first cap 24. In addition, a protuberance 46 of the first cap 24 cooperates with a locking pin 47 that protrudes from the interface cover 23 to stop rotary movement of the first cap 24. In use, as will be described in detail further on, the first cap 24 is turned with rotary movements of given angular excursion (equal to 90° for example) to align the filling holes 43*a* and 43*b* of the first and the second series with the inlet holes 32 and thus allow fluids (e.g., biological material and buffer solution) to be loaded inside the microfluidic device 1'.

The second cap 25 is arranged above the interface cover 23 in correspondence to the washing openings and has a plurality of washing holes, the layout of which reproduces that of the washing inlets and outlets 41*a* and 41*b*. Thus, there is a inlet washing hole 49*a* on the middle axis A in correspondence to one end of the second cap 25, and two outlet washing holes 49*b* arranged laterally and on opposite sides with respect to the middle axis A. In a central position, between the outlet washing holes 49*b*, there is an actuation hole 50, the function of which will be clarified further on.

The second cap 25 is slidingly movable, within purposely provided guides 51 carried on the upper surface 23*b* of the interface cover 23, due to the action of an actuator (not shown); in particular, the second cap 25 is movable between at least a closed position in which the washing holes are not aligned with the washing openings and an open position in which the washing holes are aligned with the same washing openings.

In use, the connection elements 26 exert light compression on the structural cover 22, in order to achieve the required sealing between the microfluidic device 1' and the interface cover 23, both of which are rigid elements. To this end, the connection elements 26 can include spacer elements that, through their height, control the level of compression on the structural cover 22, which acts as a sealing gasket. The ends of the connection elements 26 can be welded, glued or riveted to the base support 2.

Figure 9:
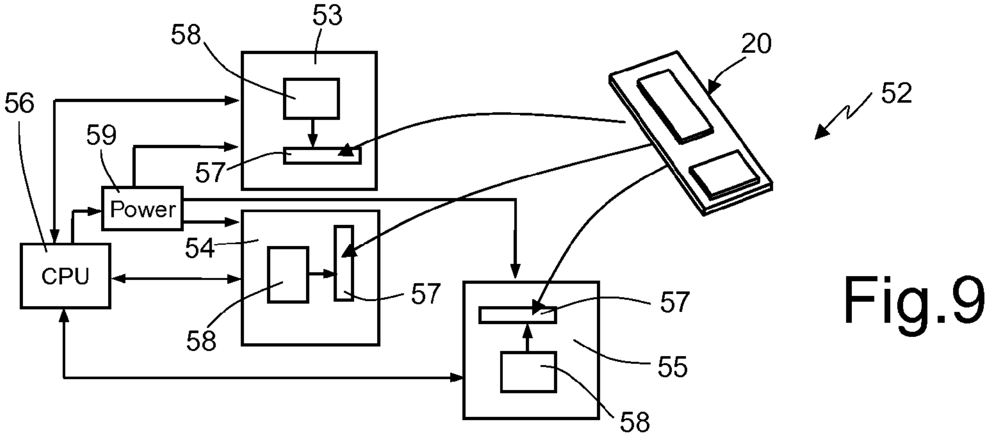
FIG. 9 shows a simplified block diagram of an analysis system including a microfluidic assembly in accordance with an embodiment of the invention.

As schematically shown in FIG. 9, an analysis system 52 cooperating with the microfluidic assembly 20 is implemented through a computer system and comprises: a loading device 53, configured to control loading of fluids inside the microfluidic device 1'; a temperature control device 54, configured to control the temperature inside the microfluidic device 1'; a reading device 55, configured to examine the microarray 12 in the detection chamber 10' at the end of the analysis process; a microprocessor-based control unit 56, configured to control the operation of the analysis system 52; and a power source 59 controlled by the microprocessor-based control unit 56 and supplying electrical power to the various devices. As schematically illustrated, each one of the devices 53, 54, 55 is equipped with a support 57 adapted to receive the microfluidic assembly 20, and an actuator mechanism 58 cooperating with the microfluidic assembly 20 to allow access to the microfluidic device 1' or seal it, according to the operating conditions—in particular, via the automated movement of the first and second caps 24 and 25 and the mobile structure 35. In a way not shown, the reading device 55 is provided with electrical coupling means for coupling the microprocessor-based control unit 56 and the power source 59 to the microfluidic device 1', in particular to the contact pads 14 thereof, and with a cooling element, e.g., a Peltier module or a fan coil, which is controlled by the microprocessor-based control unit 56 and is thermally coupled to the microfluidic die 3 when the microfluidic device 1' is loaded in the temperature control device 54.

The steps of the analysis process using the microfluidic assembly 20 will now be briefly described, with particular regard to the reciprocal positioning of the structural cover 22, the interface cover 23 and the first and second caps 24 and 25.

Figure 10A:
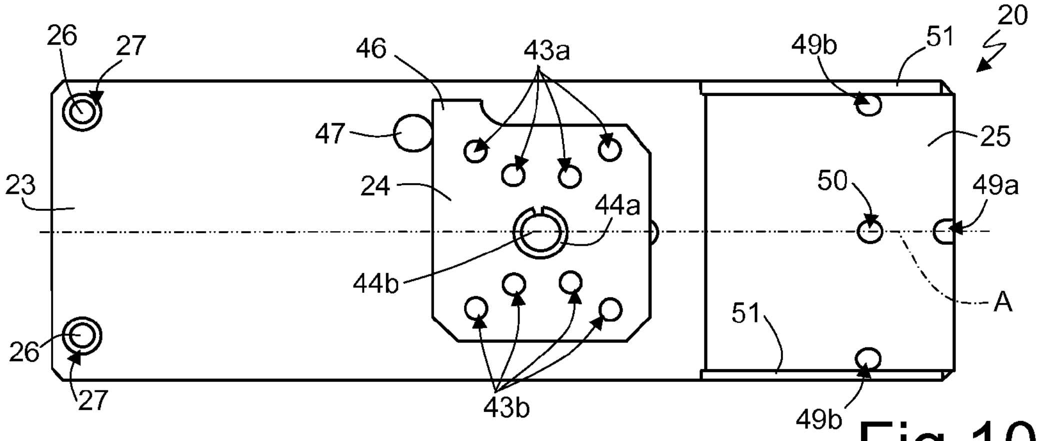
FIGS. 10A-10F are plan views of the assembly of FIG. 4, in different operating conditions.

In detail, in a step preparatory to actual use (for instance, during transportation to an end user) the microfluidic device 1' is completely sealed to avoid any contamination from the external environment. The first and second caps 24 and 25 are in the closed position (FIG. 10A), so that the filling holes 43*a* and 43*b* are not aligned with the inlet holes 32 and the washing holes 49*a*-49*b* are not aligned with the washing openings 41. In particular, the first cap 24 is in an initial position, with the protuberance 46 next to the locking pin 47 (but not in the stop position).

Figure 10B:
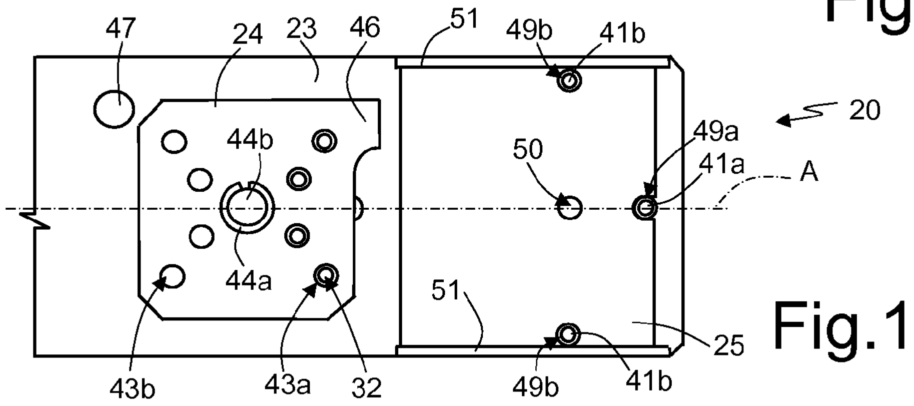

For loading of the biological material, the microfluidic assembly 20 is inserted on the loading device 53, the actuator mechanism 58 of which rotate the first cap 24 by 90° in the clockwise direction to the open position, aligning a first series of filling holes 43*a* to the underlying inlet holes 32 (FIG. 10B). The actuator mechanism 58 also makes the second cap 25 slide into the open position, so as to uncover the washing openings 41*a*-41*b* through the washing holes 49*a*-49*b*, which allows air to escape the detection chamber 10' as fluid is introduced into the microfluidic channels 8. Alternatively, these operations can be performed manually by an operator. Then, the biological material (which, for example, has just been taken from a patient) is injected into the microfluidic device 1', via a pipette inserted into the filling holes 43*a*. The fluid fills the inlet holes 32, moves along the inlet channels 33 and reaches the inlet reservoirs 6' of the structural cover 22 and the microfluidic channels 8 via the substrate inlets 7. In particular, the inlet channels 33 are sized and arranged so that they all receive the same amount of fluid. The loading operation is repeated as many times as there are filling holes 43*a* on the first cap 24.

Figure 10C:
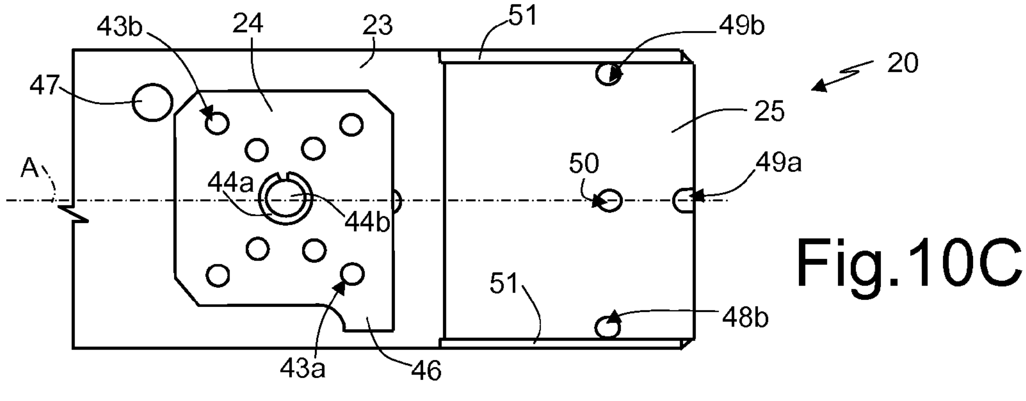

Once the loading step is completed, the first and second caps 24 and 25 are again moved to the closed position by the actuator mechanism 58 of the loading device 53 (or manually by the user); in particular, the first cap 24 is again rotated by 90° in the clockwise direction, and the second cap 25 is moved within the guides 51 to the end of the interface cover 23 (FIG. 10C). The microfluidic assembly 20 is then transferred to the temperature control device 54 for a plurality of heating and cooling cycles, during which the temperature inside the microfluidic device is repeatedly brought to around 100° C. and then cooled, to trigger DNA multiplication reactions. The temperature control device 54 automatically closes both the detection chamber 10' and the substrate outlets 9. In particular, in this case, the actuator mechanism 58 includes a pressure element that is inserted in the actuation hole 50 and exerts transverse pressure on the surface of the interface cover 23, so as to push the mobile structure 35 into contact against the walls of the detection chamber 10', thereby sealing it, and at the same time so as to push the sealing element 37 into contact against the surface of the microfluidic die 3', so as to seal the associated substrate outlets 9.

Figure 10D:
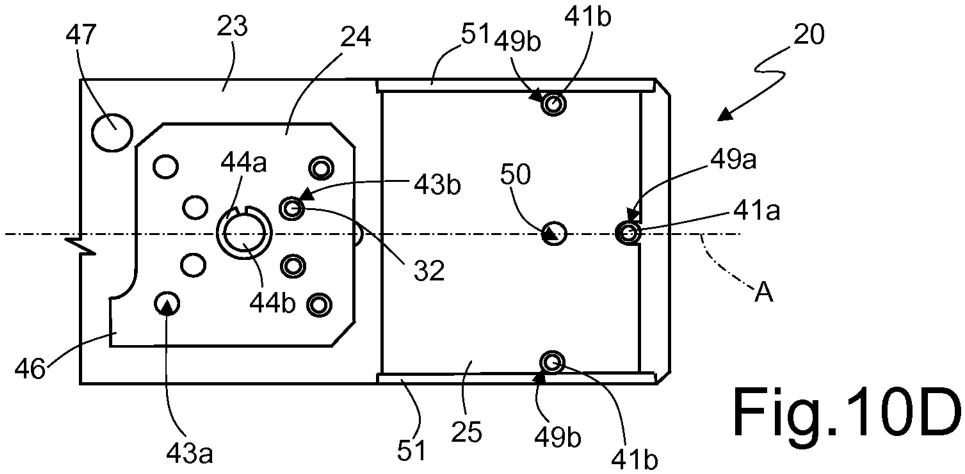

At the end of the heating and cooling cycles, the detection chamber 10' and the substrate outlets 9 are opened again, releasing the pressure on the mobile structure 35; in addition, the first and second caps 24 and 25 are moved to the open position (FIG. 10D), in particular by turning again the first cap 24 in the clockwise direction and moving the second cap 25 to the open position. The microfluidic assembly 20 is then transferred again to the loading device 53, this time for loading a buffer solution through the second series of inlet holes 43*b*, in a manner totally similar to that previously described and illustrated. In particular, the buffer solution has the function of "pushing" the biological material from the microfluidic channels 8 through the substrate outlets 9 and into the detection chamber 10'.

Figure 10E:
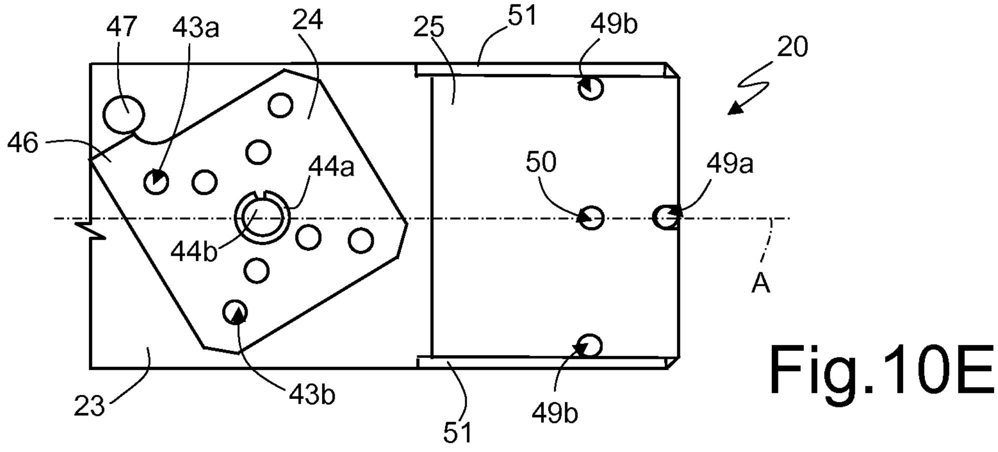
Figure 10F:
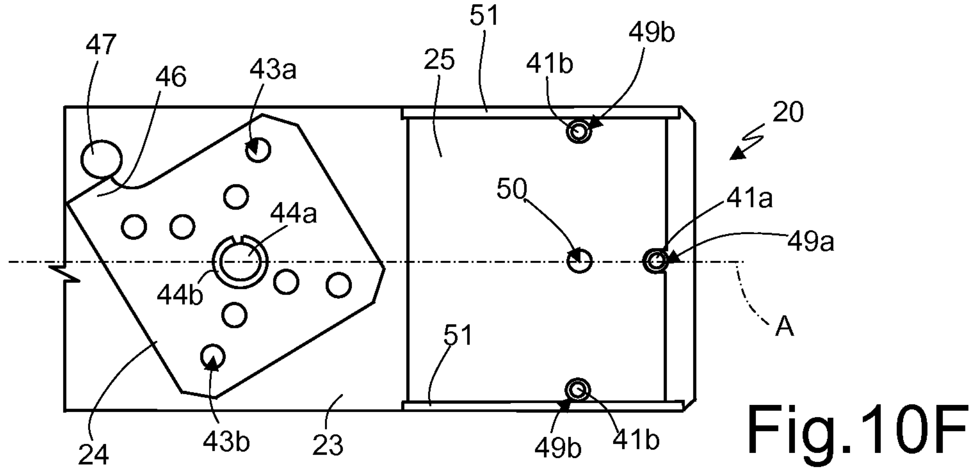

Following the second loading step, the first and second caps 24, 25 are again moved to the closed position; in particular, the first cap 24 is further rotated in the clockwise direction, so that the protuberance 46 abuts onto the locking pin 47 (FIG. 10E), thereby stopping the rotary movement (end stop position), and the second cap 25 is moved within the guides 51 to the end of the interface cover 23. A final heating cycle inside the temperature control device 54 follows, again in a similar manner to that previously described, as part of a hybridization step during which target DNA sequences bind with respective ones of the DNA probes 11. During the final heating cycle, the pressure element of the actuator mechanism 58 is again inserted in the actuation hole 50 and exerts transverse pressure on the surface of the interface cover 23, so as to seal the detection chamber 10' and the substrate outlets 9. According to an alternate embodiment, the final heating cycle is begun while the biological material is still in the buried channels, where it can be more efficiently heated by the heating elements 13. Following the heating step, and while the biological material is still hot, it is moved into the analysis chamber 10' as described above, so as to contact the DNA probes 11.

Afterwards, a washing step for washing away excess fluid and unbound DNA is carried out. For this purpose, in FIG. 1OF, the second cap 25 is moved to the open position while the first cap 24 remains in the end stop position. A washing liquid is then forced inside the detection chamber 10' through the inlet washing hole 49*a* and the underlying washing inlet 41*a*. In particular, as can also be seen in FIGS. 8A-8B, the tongue 39 and the associated inclined surface 39*a* of the mobile structure 35, given the particular layout, help to funnel the incoming liquid towards the detection chamber. Furthermore, the liquid exerts sufficient upward pressure (i.e., towards the upper surface 23*b* of the interface cover 23) on the tongue 39 to move the body element 35*b* away from the structural cover 22 and to further open and keep open the detection chamber 10'. The washing liquid, together with the excess fluid, subsequently comes out from the outlet washing holes 49*b;* the washing outlets 41*b* can usefully be connected to a vacuum pump to increase the speed of fluid extraction. In a subsequent drying step, the same washing openings 41*a*-41*b* are used to introduce hot air inside the detection chamber 10'.

Lastly, the microfluidic assembly 20 is inserted in the reading device 55, where reading operations of the microarray 12 are performed. Further actions on the microfluidic assembly 20 are not required for this operation, thanks to the fact that the material used for its manufacture is transparent and therefore does not alter the optical reading of the DNA probes 11.

The previously described integrated microfluidic device assembly has numerous advantages.

Firstly, it integrates all the functions required for the analysis of biological material and at the same time offers an external interaction (for introducing the fluids and for opening and closing accesses to the microfluidic device) that is simplified and safer with regards to risks of contaminating the biological material.

In particular, the structural cover 22, as well as defining structural elements such as the inlet reservoirs 6' and the detection chamber 10', creates sealed isolation between the microfluidic die 3' and the interface cover 23.

The inlet holes 32 through the interface cover 23 are farther spaced apart from each other than the corresponding inlets on the microfluidic die, allowing an easier filling by the user with an ordinary pipette.

Furthermore, the first and second caps 24 and 25, and the mobile structure 35 of the interface cover 23 allow, when necessary, the closure of the inlet and outlet openings of the microfluidic device and the detection chamber, in order to avoid external contamination. In particular, the first cap 24 allows the inlet holes to be closed and facilitates coupling with fluid-loading elements. The second cap 25 avoids contamination of the detection chamber 10' and the substrate outlets 9 when the microfluidic device is not inside an analysis device. The mobile structure 35 seals the detection chamber 10' and the substrate outlets 9 under the action of an external force applied, for example, by a special actuation element of an analysis device. The arrangement of these closure elements allows the automation of all, or a substantial part of the analysis operations, thereby significantly increasing reliability thereof.

The structural cover 22, interface cover 23 and the first and second caps 24 and 25 define a single package, or cartridge, for the microfluidic device 1', which is compact and economic to manufacture.

Lastly, it is clear that modifications and variants can be made to what is described and illustrated herein, without however departing from the scope of the present invention, as defined in the enclosed claims.

The channel arrangement 30 can accomplish a different "redistribution" of the inlet reservoirs 6' to the microfluidic die 3'. For example, a common inlet hole 32 can be provided for more than one inlet reservoir and associated microfluidic channels 8.

Figure 11:
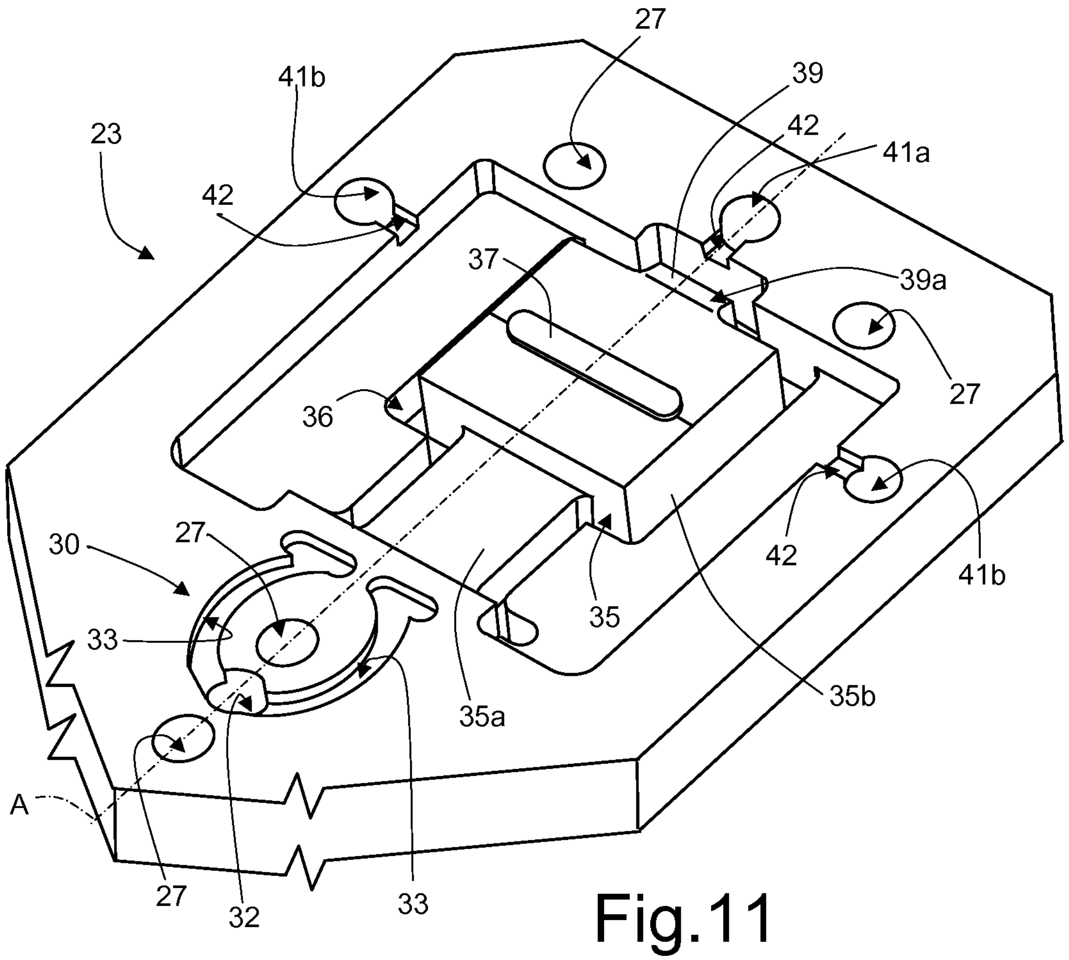
FIG. 11 is a perspective bottom view of a portion of an interface layer in accordance with a second embodiment of the microfluidic assembly according to the invention.
Figure 12:
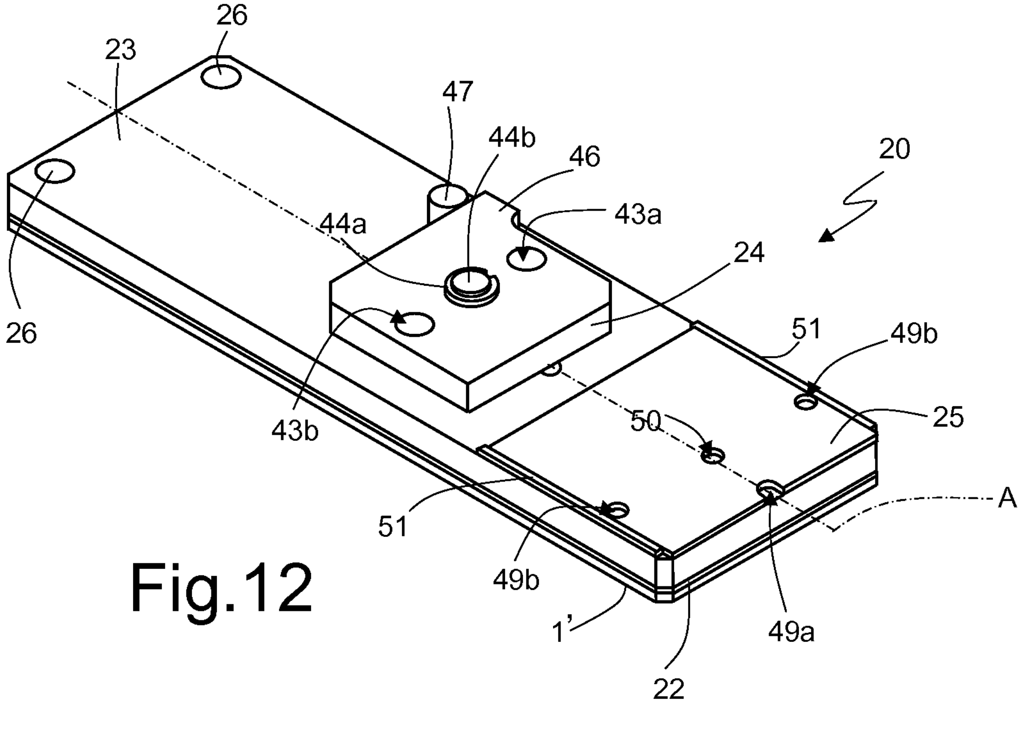
FIG. 12 is a perspective top view of the microfluidic assembly in accordance with the embodiment of FIG. 11.

In particular, as shown in FIG. 11, a single inlet hole 32 can be provided and just two inlet channels 33, in communication with the inlet hole 32 and a respective pair of inlet reservoirs 6' (connected together). The two inlet channels 33 are symmetric with respect to the middle axis A, for reasons of fluid symmetry. In this case, as shown in FIG. 12, the first cap has only two filling holes 43*a* and 43*b*, one for loading the biological material and the other for loading the buffer solution, both via the single inlet hole 32 provided in the interface cover 23.

Instead of two separate caps, a single cap can be provided above the interface cover 23, having the features and functionality of both.

Alternatively, the second cap 25 can be substituted by a region of deformable material, adhesive tape for example, fixedly coupled above the detection chamber 10'. In this case, the deformable region seals the detection chamber, until holes are made extending therethrough, in order to reach the underlying washing openings 41*a*-41*b*.

The structural cover 22 and the interface cover 23, instead of extending over the entire base support 2, could cover just the area above the microfluidic die 3'.

As previously described, the interaction operations with the microfluidic assembly 20 during the analysis steps, such as moving the first and second caps 24 and 25, for example, can be automated, or else carried out manually by a user.

The structural cover 22 can be attached directly to the interface cover 23 or the microfluidic device 1', instead of being physically separate as previously illustrated and described.

Additional recesses can be made in the structural cover 22 to accommodate additional components/elements carried by and protruding from the base support 2, such as wire covers, passive components, multichip structures, etc.

A gasket layer can be inserted between the first and/or second cap 24 and 25 and the interface cover to guarantee, following a slight compression, the sealing of the cap on the interface cover 23.

The first cap 24 can also have a number of additional openings corresponding to the number of angular positions it can assume beyond the four in the described example; special marks can be provided on the upper surface 23*b* of the interface cover 23, suitable for being seen through said extra openings to indicate to the user when a corresponding angular position of the cap has been reached with respect to the cover.

As to microreactors for DNA analysis, like those previously described, the buried microfluidic channels for amplification may communicate with separate detection chambers instead of with a same common detection chamber (as previously shown); in this case, corresponding mobile structure 35 for sealing would be required. Further, the microfluidic channels may have individual or common inlet ports or reservoirs. Various microreactor configurations are described, e.g., in US-A-20040132059, US-A-20040141856, U.S. Pat. Nos. 6,673,593, 6,710,311; 6,727,479; 6,770,471; 6,376,291, and 6,670,257.

Finally, it is evident that the microfluidic assembly 20 can be used to analyze biological material other than DNA, and to carry out analysis operations that are different from those described, such as the analysis of ribonucleic acid (RNA).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microfluidic assembly comprising:

a die in which a first inlet, and a buried channel in fluid communication with said first inlet are defined;

an analysis chamber in fluid communication with said buried channel; and an interface cover coupled in a fluid-tight manner above said die and having a sealing portion positioned directly over said analysis chamber, the sealing portion being configured to elastically deform between a first configuration, in which the sealing portion leaves said analysis chamber in fluid communication with the buried channel, and a second configuration, in which the sealing portion seals said analysis chamber from the buried channel and an environment external to the assembly.

2. The assembly according to claim 1, wherein said sealing portion is raised with respect to said analysis chamber in said first configuration, and is configured to cooperate with an external force acting in a transverse direction on an upper surface of said interface cover to move towards said analysis chamber and assume said second configuration.

3. The assembly according to claim 1, wherein said interface cover has a lower surface adapted to couple with an upper surface of said die, and said sealing portion is recessed with respect to said lower surface while in said first configuration so that the sealing portion is raised with respect to said analysis chamber, and protrudes from said lower surface of said interface cover towards said die while in said second configuration.

4. The assembly according to claim 1, wherein said sealing portion is housed in a cavity made in said interface cover and is attached to said interface cover via an elastically deformable connection portion, said cavity extending for an entire thickness of said interface cover and said sealing portion having a thickness less than the thickness of said interface cover.

5. The assembly according to claim 1, wherein a first outlet is defined in said die that places said buried channel in fluid communication with said analysis chamber, said first outlet being arranged inside said analysis chamber; and wherein said sealing portion comprises a raised element facing and projecting towards said die, and configured to protrude, in said second configuration of said sealing portion, inside said analysis chamber to close said first outlet in a fluid-tight manner.

6. The assembly according to claim 1, wherein:

said sealing portion is attached to said interface cover via an elastically deformable connection portion; and said interface cover has a washing hole communicating with said analysis chamber, and said sealing portion further comprises, in a position facing said washing hole, a tongue integral with, and extending to form a projecting part that projects from, an end surface of said sealing portion opposite to said connection portion, said tongue having an inclined surface with respect to a lower surface of said interface cover, the lower surface being configured to provide an inducement for said washing fluid to enter said analysis chamber, and to receive sufficient thrust from said washing fluid to move said sealing portion away from said analysis chamber.

7. The assembly according to claim 1, wherein said interface cover has a middle axis and a first washing hole positioned along said middle axis in fluid communication with said analysis chamber; and wherein said interface cover has additional washing holes in fluid communication with said analysis chamber, arranged laterally to said sealing portion on opposite sides of said middle axis, said first and additional washing holes in fluid communication with said analysis chamber through respective washing channels formed in said lower surface of said interface cover.

8. The assembly according to claim 1, wherein said die has additional inlets to said buried channel and said interface cover has a first inlet hole in fluid communication with one or more of said first and additional inlets, and a channel arrangement configured to place said one or more of said first and additional inlets in fluid communication with said first inlet hole.

9. The assembly according to claim 8, wherein said interface cover also has additional inlet holes in fluid communication with respective ones of said first and additional inlets, and said channel arrangement is configured to redistribute said first and additional inlet holes at a greater distance of separation than a corresponding distance of separation between respective ones of said first and additional inlets.

10. The assembly according to claim 8, wherein said buried channel includes a plurality of inlet channels isolated from each other and communicating with respective ones of said first and additional inlets.

11. The assembly according to claim 1, further comprising a structural cover positioned between and making contact with said die and said interface cover so as to create said fluid-tight coupling between said interface cover and said die, said structural cover having a through cavity defining said analysis chamber.

12. The assembly according to claim 11, wherein said structural cover comprises an elastomeric material.

13. The assembly according to claim 1, wherein said interface cover has a first inlet hole in fluid communication with said first inlet; the assembly further comprising a cap coupled above said interface cover and having a first filling hole, the cap being movable to a first closed-inlet position, in which said first inlet hole is sealed, and a first open-inlet position in which said first said first filling hole is aligned with said first inlet hole such that said first inlet hole is open.

14. The assembly according to claim 13, wherein said cap is movable to a second open-inlet position and a second closed-inlet position, said cap having a second filling hole positioned so as to be aligned with said first inlet hole when said cap is in the second open-inlet position.

15. The assembly according to claim 14, wherein said cap is rotatably coupled over said first inlet hole and configured to rotate, according to set angular excursions, among said first and second open-inlet positions and said first and second closed-inlet positions.

16. The assembly according to claim 14, wherein said die has additional inlets to said buried channel and said interface cover has additional inlet holes in fluid communication with respective ones of said additional inlets, said cap further having additional first filling holes and additional second filling holes forming, with said first and second filling hole respectively, a first and a second series of filling holes arranged according to a layout matching a corresponding layout of said first and additional inlet holes, said first and second series of filling holes being aligned with said first and additional inlet holes in said first and second open-inlet positions of said cap, respectively.

17. The assembly according to claim 1 wherein said interface cover has a first washing hole in fluid communication with said analysis chamber, the assembly further comprising a cap having an inlet hole, positioned over said interface cover and movable between a closed position, in which said first washing hole is closed, and an open position, in which said inlet hole is aligned with said first washing hole.

18. The assembly according to claim 17, wherein said cap is slidably positioned over said first washing hole, and configured to slide between said open and closed positions.

19. The assembly of claim 1, comprising a biological analysis probe positioned within the analysis chamber and configured to detect a biological material within the analysis chamber.

20. An analysis system, comprising:

a microfluidic assembly, including:

a substrate of semiconductor material, a buried channel formed in the substrate and having an inlet at a first end and an outlet at a second end, an analysis chamber positioned such that the outlet of the buried channel opens therein, and an interface cover positioned above said substrate and having a sealing portion positioned directly over the analysis chamber, the sealing portion being configured to elastically deform between a closed position, in which the analysis chamber is sealed from the buried channel and an environment external to the assembly, and an open position, in which the analysis chamber is in fluid communication with the buried channel;

at least one analysis device operable to cooperate with said microfluidic assembly; and a control unit configured to control said analysis device.

21. The system according to claim 20, wherein said analysis device comprises:

a support element, configured to house said microfluidic assembly; and an actuator mechanism configured to act on said sealing portion of said microfluidic assembly for closing, in a fluid-tight manner, said analysis chamber in certain operating conditions.

22. The system according to claim 21, wherein said actuator mechanism comprises a pressure element configured to exert a force in a transverse direction on an upper surface of said interface cover to move said sealing portion towards said analysis chamber.

23. The system according to claim 21, further comprising a cap movably positioned over said interface cover and configured to move between open-inlet and closed-inlet positions in which the inlet is, respectively, accessible and sealed, and wherein said actuator mechanism is also configured to cooperate with said cap to move said cap to said closed-inlet position and to said open-inlet position.

24. The system according to claim 20, comprising a biological analysis probe positioned within the analysis chamber and configured to detect a biological material within the analysis chamber.

25. A microfluidic assembly, comprising:

a substrate of semiconductor material having an upper surface lying parallel to a first plane;

a buried channel extending in the substrate and having an inlet at a first end and an outlet at a second end;

an analysis chamber positioned such that the outlet of the buried channel opens into the analysis chamber;

an interface cover positioned over the substrate with a lower surface facing the upper surface of the substrate and lying parallel to the first plane;

an inlet hole opening to an upper surface of the interface cover, extending transverse to the first plane, and positioned away from the inlet of the buried channel;

an inlet channel extending in the interface cover parallel to the first plane and placing the inlet hole and the inlet of the buried channel in fluid communication; and a mobile structure positioned over the analysis chamber and configured to deform between a closed position, in which the analysis chamber is sealed from the buried channel and an environment external to the assembly by the mobile structure, and an open position, in which the analysis chamber is in fluid communication with the buried channel.

26. The assembly of claim 25 wherein:

the buried channel is one of a plurality of buried channels extending in the substrate, each having an inlet and an outlet, the inlets of the plurality of buried channels being spaced a first distance apart;

the inlet hole is one of a plurality of inlet holes opening to the upper surface of the interface cover, the inlet holes being spaced a second distance apart, greater than the first distance; and the inlet channel is one of a plurality of inlet channels extending in the interface cover, each placing a respective one of the plurality of inlet holes in fluid communication with an inlet of a respective one of the plurality of buried channels.

27. The assembly of claim 26 wherein the second distance is more than an order of magnitude greater than the first distance.

28. The assembly of claim 25, comprising a cap positioned over the interface cover and movable between an open position, in which the inlet of the buried channel is accessible, and a closed position, in which the inlet is closed by the cap.

29. The assembly of claim 25, comprising a sealing element coupled to the mobile structure and positioned such that, when the mobile structure is in the closed position, the sealing element seals the outlet of the buried channel.

30. The assembly of claim 25 wherein the mobile structure is coupled to the interface cover, and wherein the interface cover further comprises a plurality of passages in fluid communication with the analysis chamber and opening to the upper surface of the interface cover.

31. The assembly of claim 30, comprising a cap positioned over the interface cover and movable between an open position, in which each of the plurality of passages is accessible, and a closed position, in which each of the plurality of passages is closed by the cap.

32. The assembly of claim 25, comprising a biological analysis probe positioned within the analysis chamber and configured to detect a biological material within the analysis chamber.

* * * * *